Figure 1:
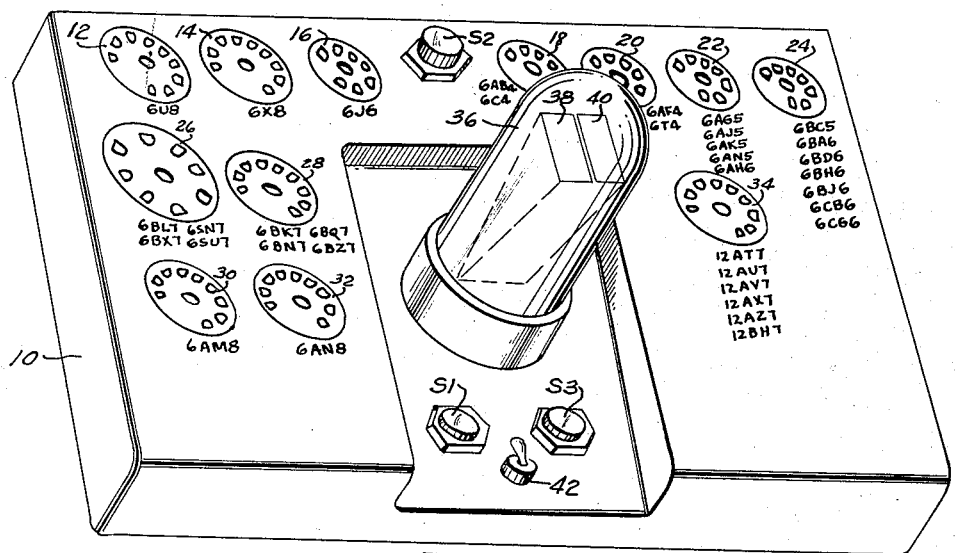

March 5, 1957

H. C. STOCK 2,784,371

FAULT TESTER FOR ELECTRON TUBES

Filed Dec. 27, 1954

INVENTOR
Herbert C. Stock,

BY
Beau, Brooks, Buckley & Beau,
ATTORNEYS

United States Patent Office 2,784,371
Patented Mar. 5, 1957

2,784,371
FAULT TESTER FOR ELECTRON TUBES

Herbert C. Stock, Holland, N. Y., assignor to Bell Aircraft Corporation, Wheatfield, N. Y.

Application December 27, 1954, Serial No. 477,749

3 Claims. (Cl. 324—22)

This invention pertains to testing equipment, and more particularly to an improved yet simplified electron tube checking apparatus.

Tube testers of a large variety of types have been successfully developed, for applying to electron tubes and the like various tests supposed to be indicative of the quality or condition of such tubes or valves. In order to handle a variety of types, particularly ones having different contacts or base pin arrangements, it has been common to provide in such testers one socket for each base pin configuration, and to utilize more or less complicated switching devices, as dictated by a chart of instructions, to apply to the proper socket the voltages necessary to indicate such tube conditions as total emission current from the cathode amplification factor or transconductance under stated conditions, open filaments and the existence of short circuits between certain tube elements. The latter test usually involves applying a substantial voltage between the elements, which voltage is also applied to a neon tube indicator. If the indicator fails to light, a short circuit between the elements is indicated. However, such an indicator, if it is to be effective, requires a rather high voltage to be applied, which may arc and damage an otherwise good tube if two elements come near one another when tapped, as is usually done by the operator during the short circuit test.

Moreover, the standard transconductance test, while it may determine the tube's compliance with specified operating conditions as to load, bias and voltage, does not indicate the presence of various defects which may actually come to light only when the tube is in use, and often only when the use involves further amplification. The meter type indicator used as a current indicator is sluggish in response, and transient effects such as microphonism, hum output and the like often will not be detected even if the tube is vibrated or rapped during a conventional test.

The present invention has for its principal object the provision of a tube checker in which an instantaneous visual signal is produced when the tube is operated under standard conditions, the tube under test being arranged so as to amplify its own defects before signalling them through the indicator. A so-called "tuning eye" tube having a visible cathode ray screen display provides high speed indication of even the more transient deviations from standard operation, so that microphonics, hum, leakage between the grid and cathode or heater and cathode or the like are interpreted as shifts in otherwise normal display patterns on the output indicator tube. While a galvanometer type meter may also be used with the invention, it must be considered a not strictly essential refinement, because an adequate indication of tube condition for most purposes (and often one which is more significant from the operational standpoint) can be had from the cathode ray device.

When electron tubes are employed in elaborate apparatus, such as in multi-stage cascaded amplifiers occurring in television and radar sets, for example, a defect that will pass the standard tube testers becomes cumulatively important. The invention provides for a test under conditions of shock or vibration, with the tube being used as an amplifier of its own defects, and does so with a minimum outlay for equipment. In addition, the checker of the invention eliminates the need for elaborate charts and their mechanical drives, by providing a plurality of sockets even duplicating base pin arrangements, the sockets being marked with the indicia of suitable tubes for test therein. Advantage is also taken of the fact that a defect in one section only of a multiple section tube (a twin triode, for example) may be and usually is sufficient cause for rejection, so that it is actually unnecessary to know which section includes a cathode-to-heater leakage path (again for example). By classifying the tubes to be handled according to general characteristics, it is possible to provide a minimum number of sockets capable of checking a very large number of types under suitable conditions, thus eliminating elaborate and expensive switches and chart arrangements.

For many laboratory and most service-call purposes, the modern tube tester is unnecessarily elaborate, and they have become increasingly cumbersome as tube types increase, even though in many cases the new type represents little more than a miniaturization of a previous type, so that while the substantive test remains the same, a new switch position or different socket must be provided, and a supplement to the chart, which is often many feet in length to accommodate the necessary data. Modern testers weighing thirty to forty pounds are not uncommon, and their cost is very high.

The present invention, in one preferred embodiment, adequately indicates the condition of no less than forty common tube types by equipment weighing only a few pounds and contained in a chassis measuring about five by seven by one and a half inches. New types, to the extent that they are comparable electrically to previous ones, can be added simply by adding their type numbers as legends to the appropriate socket. Even so, only a total of 12 sockets are required for this embodiment, or not many more than are needed for the conventional tester which necessitates elaborate switches entirely eliminated from the present invention.

Figure 2:
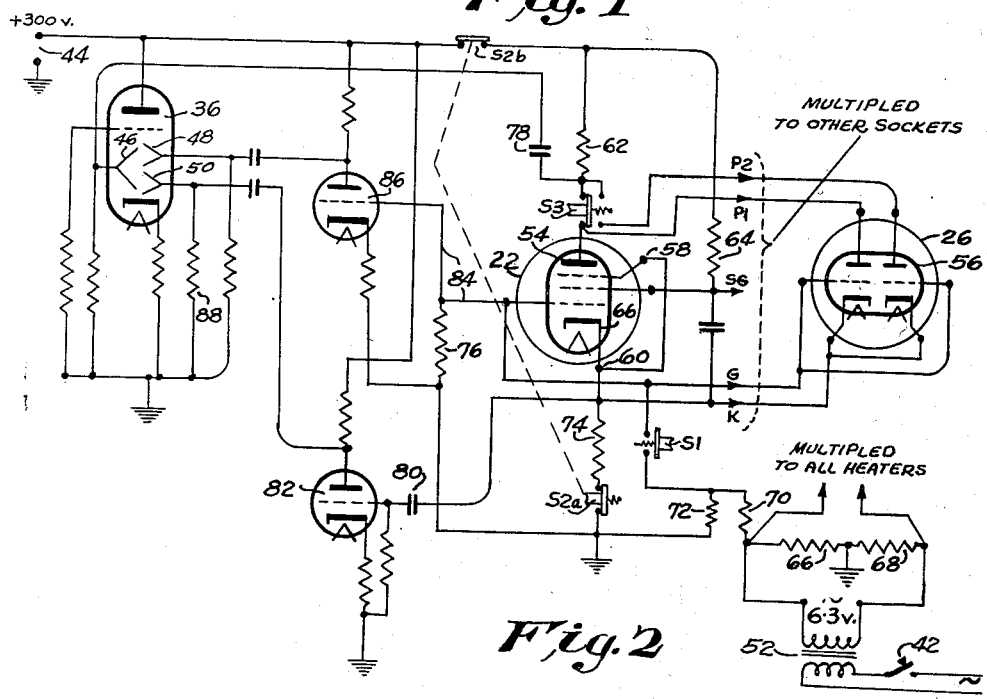

With the above and other objects and advantages in mind, the invention itself, and its principles and structural realization, will best be understood from the following detailed specification of a preferred example thereof, taken in connection with the accompanying drawings, in which:

Fig. 1 is a perspective view of the physical arrangement of a tube checker in accordance with the invention; and Fig. 2 is a schematic wiring diagram of the checker of Fig. 1.

Referring first to Fig. 1 of the drawings, the device is shown contained within and upon a conventional chassis 10, preferably having a wide flat upper face upon which are mounted a plurality of test sockets, which, while to some extent duplicates of one another, are designated by the separate reference numerals 12, 14, 16, 18, 20, 22, 24, 26, 28, 30, 32 and 34 for convenience of later reference. These sockets are those intended to be occupied by the tubes under test, it being understood that only one test socket is occupied during the testing of a tube. Beside or adjacent each of these sockets is marked, upon the chassis 10 or otherwise, a list of tube types suitable for test in that socket. The designations shown in Fig. 1 are all standard U. S. designations corresponding to the RTMA tube types, such designations to be understood throughout this specification. To the appropriate base contacts of these sockets are permanently applied (with an exception to be noted) proper voltages applicable to the types designated for them; thus, certain of the sockets (e. g. the sockets 12 and 14 for the 6U8 and the 6X8) are duplicates of one another, but have different supply voltages connected thereto. This socket arrangement eliminates the need for elaborate switches for selecting the voltages applied at different times to a single socket type, and the chassis tube-type markings eliminate the need for elaborate reference charts.

Also carried by chassis 10, in a suitable socket, is an indicator tube 36 preferably of the type 6AL7 or equivalent, the same being an electron ray tube having two juxtaposed fluorescent screen areas 38 and 40 and a total of three ray control electrodes, the same being well known to those familiar with vacuum tubes of this kind. The voltages appearing at the ray control electrodes (reference the cathode) determine the degree and position of the illumination appearing on the screens, and hence provide a sensitive and practically instantaneous indication of any changes in such voltages.

The chassis 10 also carries a switch 42, which may be a toggle switch, for turning the device on and off with reference to the mains or supply voltage, and three switches S1, S2 and S3 of the momentary or push button type, whose characteristics and functions will be described below.

Referring now to Fig. 2 of the drawings, the tuning eye tube is again designated 36, and it obtains its anode supply from any convenient source of direct current potential indicated at 44. The ground symbol throughout the schematic may represent the chassis 10 used as a common return, or a common return bus may be provided. It will be understood that an individual source of plate supply may be incorporated in the apparatus, but since it will ordinarily be used near other electronic equipment, such an external supply is almost always conveniently available. The ray control electrodes of the indicator tube 36 are designated 46, 48 and 50 respectively, and the tube 36 obtains its heater voltage from a step-down transformer 52 whose 6.3 volt secondary is connected to the filament heater terminals of all of the test sockets and whose primary is supplied from the 115 volt commercial line through the on-off switch 42. Obviously, the heater supply could also be taken from nearby apparatus, such as a television set undergoing test, but since the filament transformer is quite small, it is preferred to include it in the apparatus. In the case of twelve-volt heaters, of course, the connections to test sockets designated for such types are arranged to energize the two halves of the heater in parallel. No complications as to such connections, nor as to the other multipled connections can arise, since only one test socket is occupied at a time.

For purposes of explanation and example, a tube 54 of the pentode type (say a 6AK5) is shown connected into one of the test sockets 22, and one additional test socket 26 is also shown in detail as containing a twin triode type tube 56 such as a 6BL7. It is necessary for illustration to show the latter tube actually in place, although it will be understood that only a single tube such as tube 54 will be in place at one time. It will also be understood that the other test sockets are multipled to the plate, grid, screen grid, cathode and heater connections as indicated, where such connections are applicable to the types designated in Fig. 1 beside such sockets. Where necessary, variant plate or other voltages may be obtained for appropriate sockets as by auxiliary bleeders or series resistors, all as well known to those skilled in the vacuum tube art. It will be noted, for example, that socket 22 containing tube 54 has its suppressor grid terminal 58 permanently jumpered to its cathode terminal 60, and that both its plate and screen grid terminals are connected through appropriate dropping resistors 62 and 64 to the source 44.

The filament supply transformer secondary is connected across bleeder resistors 66 and 68 whose common terminal is grounded. The outer terminals are multipled to all of the heaters or filaments, as stated, and a lead through resistor 70 from one side of the bleeder string is connected to the control grid terminal of socket 22 via switch S1, to apply an alternating voltage between grid and cathode when the switch is momentarily closed. The value of this voltage is set by resistors 70 and 72 which constitute a voltage divider from one side of the heater circuit to ground. The grounded tap between resistors 66 and 68 also provides an alternating voltage between the cathode and heater when switch S1 is closed and switch S2 is operated to open S2a and S2b. Section S2a disconnects ground from the cathode so that the return circuit to the alternating source is completed only between the cathode and heater, and section S2b opens the plate and screen supply circuits at such time to eliminate from the indication the effect of tube transconductance, which might otherwise mask the leakage indication.

Resistor 62 constitutes the plate load for tube 54 under test, resistor 74 its cathode resistor and resistor 76 the grid return resistor. With switch S2 closed (not operated), space current will flow through resistors 62 and 74. A capacitor 78 couples the plate voltage of the tube 54 to the control electrode 46 of the indicator tube 36, and a capacitor 80 couples the cathode of tube 54 to the input of an amplifier tube 82 whose output controls the voltage applied to ray control electrode 50 of the indicator tube. Also, a conductor 84 couples the grid of tube 54 under test to the input of a second amplifier 86 whose output controls the voltage on control electrode 48 of the indicator. In either case, either direct or capacitance coupling may be employed, as well understood by those skilled in the art. The tubes 82 and 86 may be separate amplifiers, or they may constitute the two section of a twin type amplifier such as a 12AX7 or equivalent. The circuitry of these amplifiers as such, as well as that for tube 36, is conventional and hence is not described herein in detail.

Any change in plate or space current in tube 54, due to heater-cathode leakage, with or without vibration, will cause condenser 80 to charge and discharge, which will cause an A. C. voltage to be developed across load resistor 88 of the electron ray tube grid 50, and the corresponding screen 38 will show a bar pattern or fuzziness due to this voltage. Since the tube under test will itself amplify this leakage, a bar or fuzziness will also appear due to the A. C. appearing on control electrode 46 of the indicator. Since the plate current change may also effect the voltage picked up by the grid of tube 54, fuzziness may also appear on the other screen 40. If switch S2 is operated to open the cathode to ground circuit of the tube under test, an A. C. voltage will be applied to amplifier 82 if there is any leakage between the heater and cathode. If there is a grid-to-cathode short or even a relatively high resistance path between them, the screens of tube 36 will flicker or show moving bars as the tube under test is rapped. In the case of a low resistance grid-to-cathode short, the operation of a switch S1 may not be accompanied by the normal indication at the indicator tube of any amplification whatever by the tube 54 under test.

A wide variety of rapid tests for tube reliability and stability may thus be performed, with certainty that even transient effects not registered by conventional instruments will be noticeable.

The function of switch S3 is to permit the triode sections of twin triodes to be tested separately in a single socket. As shown, this switch, in the case of a tube inserted in a socket such as at 26, merely removes the anode supply voltage from the pin corresponding to one triode plate and applies it to the pin corresponding to the other triode plate. No such change is required for the screen, grid and cathode terminals, since only one tube is tested at a time, and the same supply parameters will apply to both sections of a twin unit tube.

It will be realized that the amplifiers 82 and 86 are not strictly essential to the novel features of the device, although they provide increased sensitivity where such is desirable, and especially where the self-amplification due to the tube under test is itself inadequate to give the most significant indication at the electron ray tube screens. The inclusion of such amplifiers (as by use of a miniature twin triode) adds little to the size and weight of the equipment, and is generally desirable for this reason.

It will be seen from the above description that I have devised a simple and compact tube checker which is suitable as a substitute for ordinary large and expensive testers for house or field calls in radio and television servicing, and which will in fact detect latent or actual defects, both electrical and mechanical, that would be passed by the ordinary tester. However, the principles of the invention can also profitably be incorporated in the larger devices, where desired, since little cost, size or weight would be added. Such an adjunct would greatly increase the reliability of tests made in the shop or laboratory with the conventional tester. Additionally, various changes in the particular arrangement disclosed herein can be made without departing from the invention, whose scope is therefore to be determined from the appended claims, and not limited to the particular details described above and illustrated in the drawings.

What is claimed is:

1. A thermionic tube tester comprising a plurality of mounted tube sockets, each designated with appropriate tube type markings to indicate the types of tubes which can be tested therein; D. C. plate and A. C. heater power supply terminals and dropping resistors; corresponding terminals of the respective different sockets being multipled together by conductors elading to common junctions, one for each class of corresponding terminals, and individual circuits for interconnecting said common junctions to the appropriate terminals of said resistors and said power supplies to supply proper operating potentials to any one tube inserted in the socket bearing the designation of that tube; switches for selectively interrupting certain of said circuits to provide alternative performance tests, and a multiple-display cathode ray indicating tube having display control electrodes coupled to certain of said common junctions to provide performance indications for a single thermionic tube inserted in the appropriately designated one of said sockets.

2. A thermionic tube testing apparatus comprising a support, a plurality of tube sockets carried by said support, markings respectively associated with each socket indicating the type numbers of tubes which can be tested therein, a center-tapped alternating current cathode heater supply having its center-tap grounded and its end points connected in multiple to the heater terminals of all of said sockets, the suppressor-grid and cathode terminals of all of said sockets being connected together and grounded through a single common cathode resistor and a first normally-closed switch, means for connecting a first plate terminal of all the sockets to a source of positive D. C. potential through a plate resistor and a second normally-closed switch, said normally-closed switches being ganged for simultaneous operation between open and closed condition, connections from the screen-grid terminals of all the sockets through a common dropping resistor to said source of positive D. C. potential through the second normally-closed switch, connections from the control grid terminals of all of the sockets through a common grid resistor to ground, a normally-open switch for connecting all of said grid terminals to one side of said cathode heater supply through a dropping resistor, a plural-screen electron ray indicating tube, and connections for applying to the control electrodes of said indicating tube voltages derived from the grid, plate and cathode electrodes of a single thermionic tube inserted in the appropriately designated one of said sockets.

3. A thermionic tube testing apparatus comprising a support, a plurality of tube sockets carried by said support, markings respectively associated with each socket indicating the type numbers of tubes which can be tested therein, a center-tapped alternating current cathode heater supply having its center-tap grounded and its end points connected in multiple to the heater terminals of all of said sockets, the suppressor-grid and cathode terminals of all of said sockets being connected together and grounded through a single common cathode resistor and a first normally-closed switch, means for connecting a first plate terminal of all the sockets to a source of positive D. C. potential through the series combination of a two-circuit switch, a plate resistor and a second normally-closed switch, certain of said sockets having an alternate plate terminal and all of these being connected together and through the alternate path of said two-circuit switch to said source of positive D. C. potential through the series combination of said plate resistor and said second normally closed switch, said normally-closed switches being ganged for simultaneous operation between open and closed condition, connections from the screen-grid terminals of all the sockets through a common dropping resistor to said source of positive D. C. potential through the second normally-closed switch, connections from the control grid terminals of all of the sockets through a common grid resistor to ground, a normally-open switch for connecting all of said grid terminals to one side of said cathode heater supply through a dropping resistor, a plural-screen electron ray indicating tube, and connections for applying to the control electrodes of said indicating tube voltages derived from the grid, plate and cathode electrodes of a single thermionic tube inserted in the appropriately designated one of said sockets.

References Cited in the file of this patent
UNITED STATES PATENTS

| | | |
|---|---|---|
| 1,829,448 | Jackson, P. F. | Oct. 27, 1931 |
| 2,167,842 | Jackson, K. S. | Aug. 1, 1939 |
| 2,235,173 | Shepard | Mar. 18, 1941 |
| 2,457,575 | Liebscher | Dec. 28, 1948 |